United States Patent
Croce et al.

[15] 3,693,596
[45] Sept. 26, 1972

[54] DOG LEASH RETRIEVER

[72] Inventors: Joseph Croce; Kurt Bayer, both of 742 Deerpark Ave., Babylon, N.Y.

[22] Filed: June 1, 1971

[21] Appl. No.: 148,828

[52] U.S. Cl. ............119/109, 242/107.4, 242/107.6, 242/102.12
[51] Int. Cl. ..............................................A01k 27/00
[58] Field of Search .....119/106, 109; 242/99, 107.3, 242/107.4, 107.6, 107.12; 188/82.7

[56] References Cited

UNITED STATES PATENTS 2,919,676  1/1960  Schneider..................119/109
2,976,959  3/1961  Husted ....................188/82.7
3,250,253  5/1966  Galin......................119/109
3,578,260  4/1971  Kell.......................242/107.4
3,635,419  1/1972  Pringle...................242/107.4

Primary Examiner—Aldrich F. Medbery
Attorney—Richard S. Shreve, Jr.

[57] ABSTRACT

A reel type spring wound extendible animal leash controlled by cam and gears under manual setting of a select lever to have four different positions: locked leash; free movement of leash; leash restrained to be payed but not to be wound up; and leash restrained to be wound up but not unwound.

5 Claims, 6 Drawing Figures

PATENTED SEP 26 1972 3,693,596
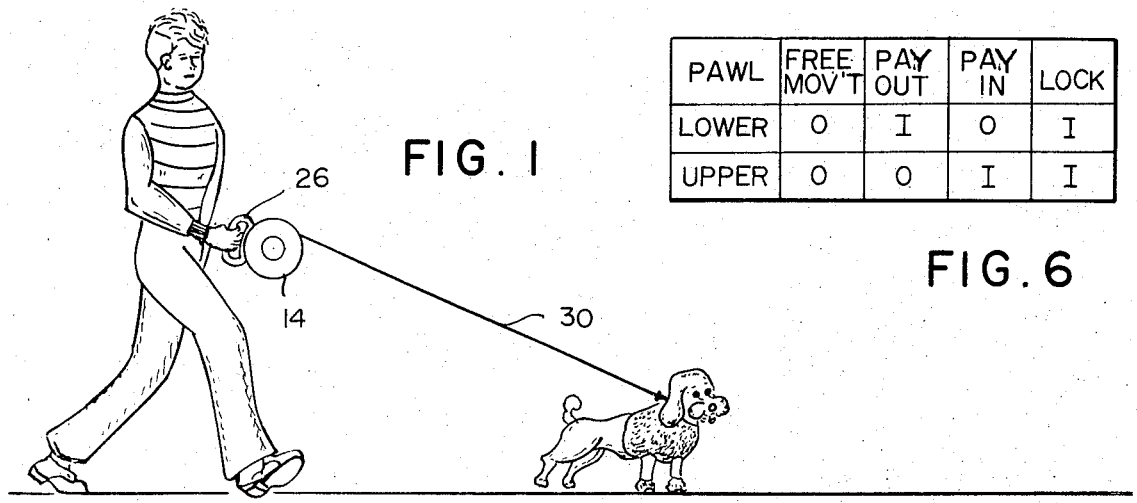
FIG. 1
| PAWL | FREE MOV'T | PAY OUT | PAY IN | LOCK |
|---|---|---|---|---|
| LOWER | O | I | O | I |
| UPPER | O | O | I | I |
FIG. 6
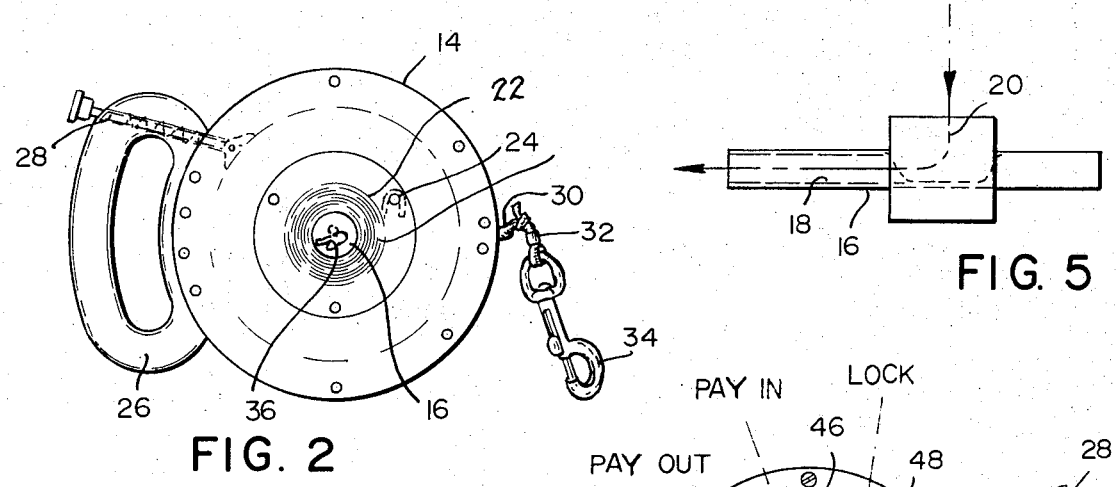
FIG. 2
FIG. 5
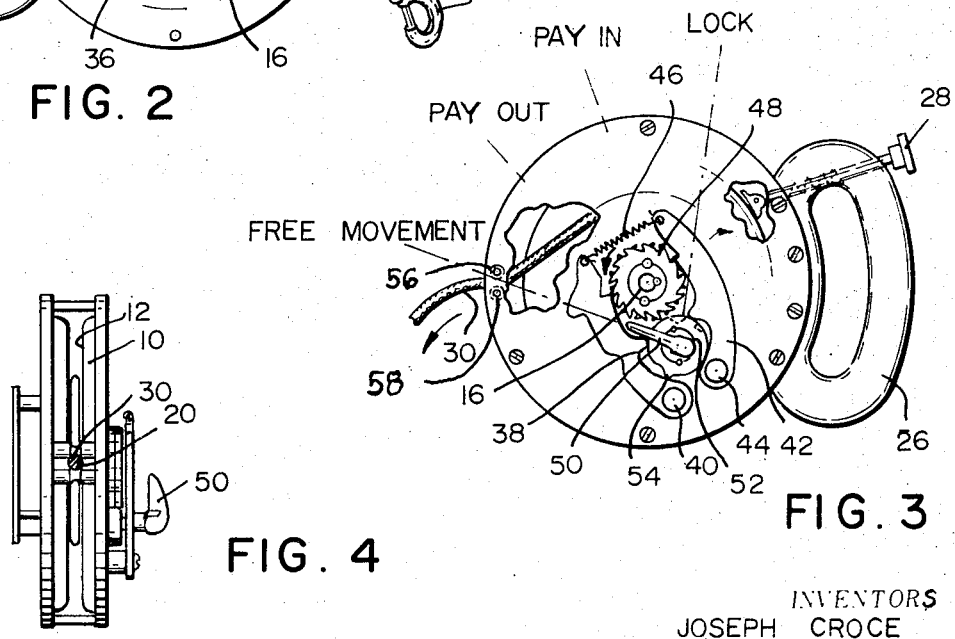
FIG. 4
FIG. 3
INVENTORS
JOSEPH CROCE
KURT BAYER

DOG LEASH RETRIEVER

SUMMARY OF THE INVENTION

In accordance with our invention a reel having a peripheral groove is disposed rotatably in a casing having a handle with a manually controlled spring loaded reel stop. The reel has an axial shaft. A leash extends through a bore in the shaft and is wound about the reel. Two pawls are disposed around the shaft which carries a two level compound gear ratchet. A manually select lever controls the position of a two level compound cam. The interaction of pawls, gear and cam under the control of the lever enables a choice of four positions. In one position, the leash can be freely wound or unwound as desired; in a second position the leash can be unwound but not wound; in the third position, the leash can be wound (with the assistance of a flat coil spring,) but not unwound; and in the fourth position, the reel is locked and the leash can be neither wound or unwound.

BRIEF DESCRIPTION OF THE DRAWINGS

In the drawings:
FIG. 1 is a side view of my invention in use;
FIG. 2 is a side view of my invention per se;
FIG. 3 is a cross sectional view of the structure shown in Fig 2;
FIG. 4 is an end view of my invention;
FIG. 5 is a detail view illustrating the relationship between rope and central shaft; and
FIG. 6 is a chart of various pawl positions.

DETAILED DESCRIPTION OF PREFERRED EMBODIMENTS

Referring now to FIGS. 1 –6, a reel 10 having a peripheral annular groove 12 is disposed in casing 14 secured about a transverse center shaft 16 having an axial bore 18 with a transverse bore 20 having access thereto. A flat coil spring 22 is disposed around the shaft and is secured to the reel via pin 24. Casing 14 has a handle 26 with a manually controllable spring loaded reel stop 28. A leash 30 extends through bore 18 and out through bore 20 to be wound about the groove of the reel. The free end of the leash is connected via stop 32 to clamp 34. The other end of the leash is knotted as shown at 36. The leash extends into the casing between guide rollers 56 and 58. An upper pawl 38 pivotally secured at one end at pivot 40 and a lower pawl 42 pivotally secured at a corresponding end to pivot 44 have their opposite ends connected by pawl tension spring 46 and include oppositely directed ratchet engaging means.

A compound ratchet with two levels in opposite directions is disposed around the shaft. A manual select lever 50 controls the position of a compound cam 52 with two levels. A stop post 54 is on the lower cam only.

The lever has four positions: free movement, locked, pay out and pay in. When the lever is in free movement, neither pawl interferes with pulley rotation. The periphery of cam 52 engages the central lug of upper pawl 38 to hold it away from an upper level ratchet portion of a compound ratchet 48, and also engages central lug of lower pawl 42 to hold it away from the lower level ratchet portion of the compound ratchet 48.

When the lever is in locked position, the pawls are positioned to prevent movement in either direction. The cam 52 has depressions to receive central lugs of pawls 38 and 42 to let them respectively engage the upper and lower ratchets 48.

The 0 positions shown in FIG. 6 indicate that the corresponding pawl or pawls are out; the I positions indicate that the corresponding pawl or pawls are in. In the other two positions, either one of the pawls is out while the other pawl is simultaneously in. In pay out, the leash can be payed out but cannot be pulled in. In pay in, the leash can be pulled in to be wound up with the assistance of the spring; the leash cannot be pulled out when the lever is in pay in position.

While we have described our invention with particular reference to the drawings, such is not to be considered as limiting its actual scope.

Having thus described this invention, what is asserted as new is:

1. A device having an extendible animal leash comprising:
   a shaft;
   a reel having a peripheral groove, the shaft extending through the center of the reel as an axis of rotation, said leash passing through the shaft and wound about the groove;
   upper and lower pawls disposed about the shaft, each pawl being pivotable about a corresponding end and having oppositely directed engaging means;
   means interconnecting the other ends of the pawls;
   a compound ratchet disposed around the shaft and disposed between the pawls;
   a compound cam disposed adjacent the gear between the pawls; and
   a select lever manually controlling the position of the cam.

2. A device as set forth in claim 1 wherein said means is a coil spring.

3. A device as set forth in claim 1 wherein said ratchet has two levels.

4. A device as set forth in claim 3 wherein said cam has two levels.

5. A device as set forth in claim 4 wherein said reel and shaft are interconnected by a flat coil spring.

* * * * *